July 28, 1931.  A. M. FURTOW  1,816,147

WHEEL, RIM, AND TIRE LOCK

Filed March 21, 1929

INVENTOR
ALBERT M. FURTOW
BY
Barnes, Dickey & Pierce
ATTORNEY

Patented July 28, 1931

1,816,147

UNITED STATES PATENT OFFICE

ALBERT M. FURTOW, OF MOUNT CLEMENS, MICHIGAN

WHEEL, RIM, AND TIRE LOCK

Application filed March 21, 1929. Serial No. 348,844.

The principal object of my invention is to provide a simple and efficient means for locking automobile tires and rims to the wheels in order to prevent their unauthorized removal.

With this and other objects in view, my invention consists in the arrangement, combination and construction of the various parts of my improved device as described in the specification, claimed in my claims, and shown in the accompanying drawings, in which:

Figure 3:
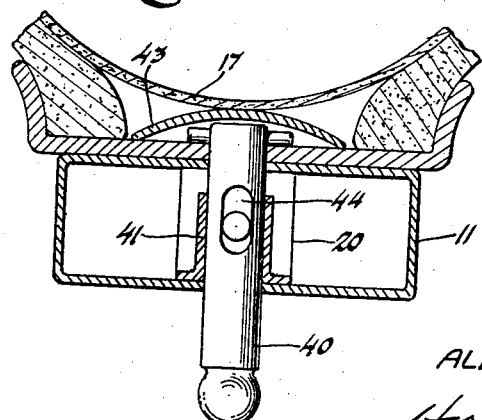
Fig. 3 is a view taken on the line 3—3 of Fig. 2.

The numeral 10 designates a vehicle wheel having a felloe 11 preferably of box section metal, as shown in Fig. 3. 12 designates the tire rim and 13 the tire. 14 indicates my device generally as applied to the vehicle wheel and tire rim, preferably in a position opposite the valve stem 15.

Figure 1:
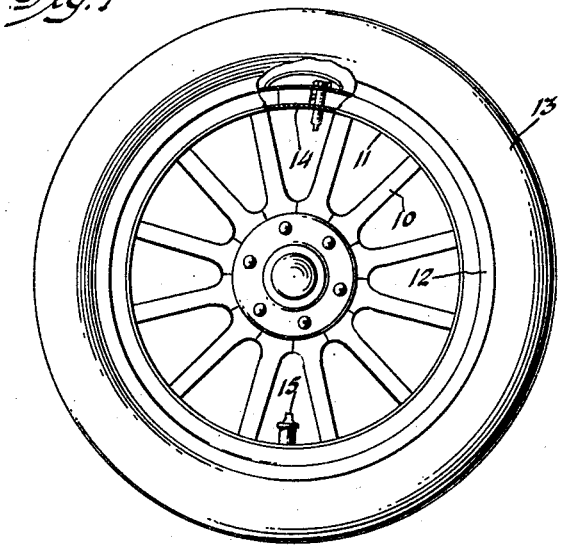
Fig. 1 is a side elevation of a wheel and tire having a portion broken away to show the application of my device.
Figure 4:
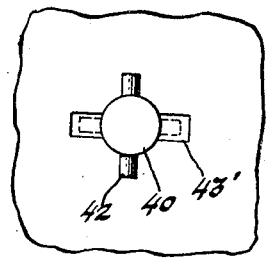
Fig. 4 is a plan view of that portion of the tire rim to which my device is applied.
Figure 2:
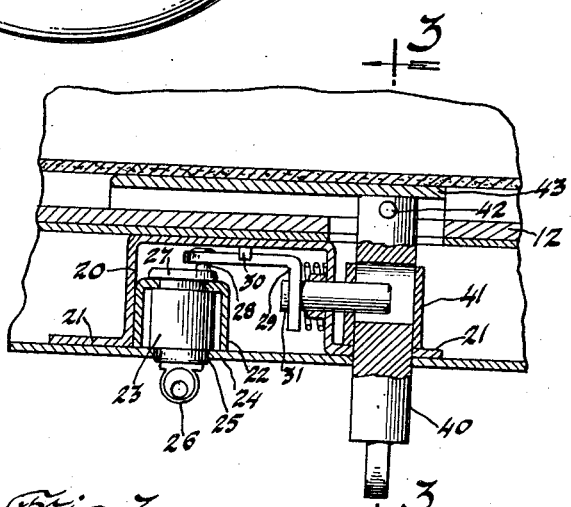
Fig. 2 is a fragmentary sectional view taken laterally of that portion of the wheel rim and tire to which my device is applied.

My device comprises a box-like casing member 20 having lateral flanges 21 extending from each of its ends, which may be spot welded or otherwise suitably secured to the inner side of the box felloe 11 as shown in Fig. 2. The box 20 is rectangular in shape, having the side adjacent the flanges 21 open. Secured in one side of the box is an inverted cup-like casing member 22 which has one side welded or otherwise suitably secured to the side of the box 20. The open side of the casing 22 faces toward the hub of the wheel. In this casing 22 is mounted a conventional barrel lock mechanism 23 which comprises a casing 24 and a rotatable barrel 25 adapted to be operated by means of a removable key 26. The key end of the barrel 25 extends toward the hub through a suitable opening. The other end of the barrel is journalled in the bottom of the cup member 22 and has on its inner end a disc member 27 which overlaps and bears upon the bottom of the cup member 22. In this disc 27 is secured an eccentric pin 28, adapted to impart longitudinal movement to an L-shaped link member 29, shown as having a shank with which may cooperate a guide lug or lugs 30, optionally provided in the top side of the box 20. In the foot portion of the link member 29 is secured a lock bolt 31 which extends through an opening in the side of the box 20. A boss is struck out inwardly around this opening and a coil spring mounted around the boss and adapted to bear between the side of the box 20 and the foot portion of the link 29 and tensioned to normally force the link inwardly of the box 20 to retract the bolt 31. In the flange member 21 adjacent the end of the box through which the bolt 31 projects, is formed an opening of sufficient size to take the pin 40. Beneath the opening in this flange member a like registering opening is formed in the felloe 11 so that the pin 40 may extend outwardly of the felloe toward the hub a sufficient distance to permit manual manipulation. A boss 41 may be formed around the opening in the flange member 21 as a guide for the pin 40, if desired, or it may be omitted if desired. The top wall of the felloe is provided with a registering opening immediately above the opening in the foot member 21 through which the pin 40 is extended, and the tire rim 12 is provided with an opening registering with the opening in the felloe, and of a size to permit the projection of the pin 40 therethrough. To the outer end of the pin 40 are secured lateral projections 42 extending from the opposite sides thereof. Slots 43', as shown in Fig. 4, are provided leading from the opposite sides of the pin opening in the rim 12, to accommodate and permit the passage of the lateral projections 42. An arched cap member 43 is provided for the rim 12 to cover the end of the pin 40 and to protect the inner tube 17 of the tire 13 from chafing contact with the end of the pin 40. The pin 40 is provided with a transverse slot 44 through its intermediate portion, which is adapted to accommodate the projecting end of the bolt 31. The slot 44 is somewhat elongated to provide for easy insertion of the pin 31.

In operation, the pin 40 is pushed outwardly through the felloe 11 until the projections 42 clear the surface of the rim member 12. The pin is then turned to throw the projections 42 out of register with the slots 43' so that they will bear upon the surface of the rim member. When they are in this position the slot 44 is in position to register with the bolt 31 and the lock is operated to throw the bolt 31 outwardly into the slot 44 and left in this position, and the key removed from the lock barrel. The rim and tire are then secured and locked to the felloe, as the pin 40 cannot be turned, on account of the bolt 31, to throw the projections 42 in register with the slots 43 in the rim, and thus permit retraction of the pin 40.

When it is desired to release the tire and rim the lock is operated to retract the bolt 31 from the slot 44. The pin 40 is then turned manually to bring the projections 42 in register with the slots 43', in the rim 12, and the pin then pulled inwardly until it clears the rim 42, and the tire and rim may then be removed.

Formal changes may be made in the specific embodiment of the invention described without departing from the spirit or substance of the broad invention, the scope of which is commensurate with the appended claims.

What I claim is:

1. In combination with a vehicle wheel and a removable tire carrying rim mounted thereon, means for locking said rim and tire to said wheel comprising a slotted pin slidably extending through the felloe of said wheel and provided with means interiorly to engage said rim, a locking device including a bolt and enclosed within said felloe, said bolt being adapted, by entrance in said slot, to secure said pin in position of engagement with said rim, said locking device being operable by movable means serving slidably to manipulate said bolt and thereby to release said pin so that it may be withdrawn from engagement with said rim or secured in position of engagement therewith.

2. In combination with a vehicle wheel, and a removable tire carrying rim mounted thereon and having a slotted opening in its bottom, a pin rotatably and reciprocably secured in the felloe of said wheel adapted to engage said rim through the slotted opening therein and lock the same to said felloe, key actuated locking means enclosed within said felloe and operable to secure said pin in locking engagement with said felloe.

3. In combination with a vehicle wheel comprising a felloe, a rim mounted thereon and having an opening in its bottom, a pin reciprocable and rotatable in the felloe of said wheel and having lateral projections on its end adapted to pass through said opening and engage the inner side of said rim, a locking device enclosed within said felloe and adapted to engage and secure said pin in its position of engagement with said rim, said device including means manipulable by a key to release said pin so that it may be rotated and withdrawn from engagement with said rim or to secure said pin against rotation and reciprocation in its position of engagement with said rim.

4. In combination with a vehicle wheel and a removable tire carrying rim mounted thereon having a key hole opening in its bottom, a slotted pin rotatably and reciprocably secured in the felloe of said wheel and having lateral projections on its end and adapted to engage said rim through said keyhole opening, a bolt enclosed within said felloe adapted to engage the slot in said pin for locking the same in engagement with said rim, and key actuated means enclosed within said felloe for moving said bolt and securing the same in or out of engagement with said pin.

5. In means for securing a rim to a felloe, said rim and felloe being provided with registering openings for the reception of a pin and said felloe being provided with slots extending from the opening therein: a pin provided with lateral projections, insertable through said slot, for engagement with said rim upon rotation of said pin; and means for locking said pin against rotation, said pin being slotted and said locking means including a bolt slidable relatively to the slot in said pin.

ALBERT M. FURTOW.